United States Patent [19]

Kemper

[11] Patent Number: 4,957,474
[45] Date of Patent: Sep. 18, 1990

[54] TRACTION DRIVE TRANSMISSION SYSTEM

[75] Inventor: Yves J. Kemper, Bloomfield Hills, Mich.

[73] Assignee: Tractiontec Corporation, Bloomfield Hills, Mich.

[21] Appl. No.: 497,528

[22] Filed: Mar. 22, 1990

Related U.S. Application Data

[63] Continuation-in-part of Ser. No. 435,658, Nov. 13, 1989, abandoned, which is a continuation-in-part of Ser. No. 270,639, Nov. 14, 1988, abandoned.

[51] Int. Cl.⁵ .................... F16H 15/56; F16H 37/06
[52] U.S. Cl. .................................... 475/279; 74/191; 475/330
[58] Field of Search .............. 475/279, 290, 329, 330; 74/190, 191

[56] References Cited

U.S. PATENT DOCUMENTS

| | | | |
|---|---|---|---|
| 2,086,491 | 7/1937 | Dodge | 475/216 |
| 2,716,357 | 8/1955 | Rennerfelt | 475/216 |
| 3,203,278 | 8/1965 | General | 475/47 |
| 3,675,507 | 7/1972 | Takekawa | 475/81 |
| 3,714,845 | 2/1973 | Mooney, Jr. | 475/81 |
| 3,969,958 | 7/1976 | Miyao et al. | 475/82 |
| 4,297,918 | 11/1981 | Perry | 74/200 |
| 4,355,547 | 10/1982 | Poole et al. | 475/217 |
| 4,363,247 | 12/1982 | Weseloh | 475/82 |
| 4,382,392 | 5/1983 | Meyerle et al. | 475/81 |
| 4,434,681 | 3/1984 | Friedrich et al. | 475/82 |
| 4,626,787 | 12/1986 | Singer | 475/82 |
| 4,630,494 | 12/1986 | Kemper | 74/191 |
| 4,644,820 | 2/1987 | Macey et al. | 475/211 |
| 4,682,511 | 7/1987 | Wittke | 475/218 |
| 4,693,134 | 9/1987 | Kraus | 475/216 |
| 4,745,821 | 5/1988 | Kemper | 74/190 |
| 4,856,371 | 8/1989 | Kemper | 74/191 X |

FOREIGN PATENT DOCUMENTS

| | | |
|---|---|---|
| 0043184 | 1/1982 | European Pat. Off. . |
| 3543635 | 6/1986 | Fed. Rep. of Germany . |
| 2115091 | 9/1983 | United Kingdom . |

*Primary Examiner*—Dwight Diehl
*Attorney, Agent, or Firm*—Robert F. Ziems

[57] ABSTRACT

A multi-range continuously variable power transmission system having a rotatable system input shaft (52) and a rotatable system output shaft (72), a continuously variable transmission unit (CVT) (14) having CVT input (52) and CVT output shaft (54), a four shaft compound planetary gear power splitter (73) having a first shaft (78) driven by the system input shaft, a second shaft (80) driven by the CVT output shaft a third shaft (84) and a fourth shaft (86) and a multi-range output gear box (75) for driving the system output shaft. The gear box is in the form of a planetary gear set having a carrier shaft (87) eccentric with respect to and connected to the system output shaft (72), sun gear (89) and a grounded ring gear (90). Control means (77) in the form of a plurality of clutches (C1, C2, C3, C4) and at least one heat dissipating friction clutch (D1) is provided for connecting the third and fourth shafts of the splitter to the gear box in a manner to effect four synchronous ranges of system speed, each of such ranges being continuously variable by shuttling the CVT ratio between its extreme ratios. The heat dissipating friction clutch (D1) releasably grounds the gear box ring gear and operates as a starting device to increase the speed of the system output shaft from 0 up to lowest output/input speed of the transmission system.

15 Claims, 6 Drawing Sheets

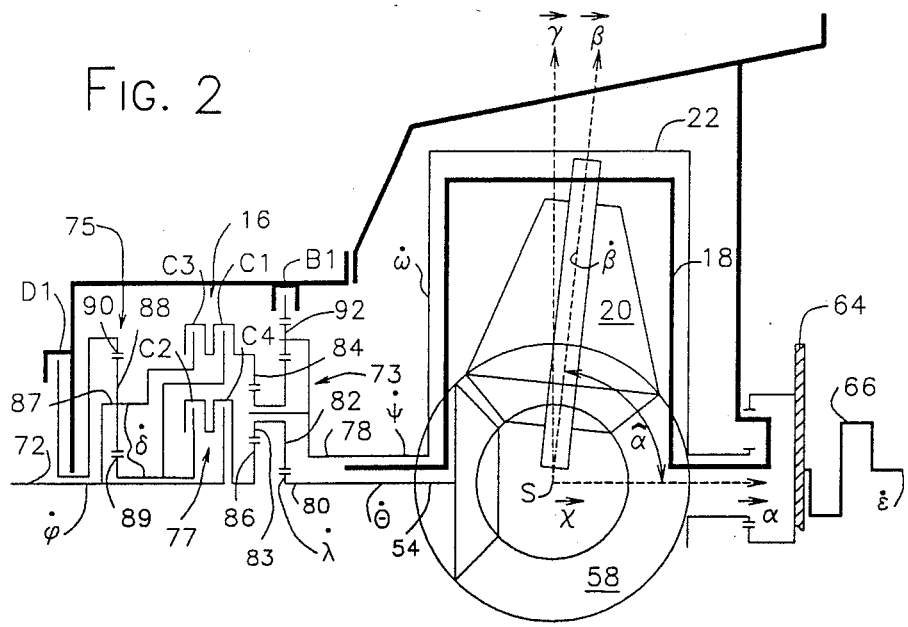

| $P_1$ | $=-0.154$ |
|---|---|
| $P_2$ | $=+0.251$ |
| $\kappa_{in}$ | $=+1.200$ |
| $\kappa_3$ | $=+0.378$ |
| $\kappa_4$ | $=+1.000$ |

FIG. 2T ($+1.00 < K\rho < +3.5$)

| POINT | MEMBERS APPLIED | $K\rho$ | $\dot{\delta}/\dot{\omega}$ | $\dot{\varphi}/\dot{\omega}$ | $\dot{\varepsilon}/\dot{\varphi}$ | |
|---|---|---|---|---|---|---|
| 10BH | C4,CVT | 3.5 | 1.63 | +1.63 | +0.51 | |
| 90BH | C4,CVT | 1.00 | 1.00 | +1.00 | +0.80 | |
| 90DH | C3,C4 | | 1.00 | +1.00 | +0.80 | ← SYNCHROSHIFT |
| 90AH | C3,CVT | 1.00 | 1.00 | +1.00 | +0.80 | |
| 10AH | C3,CVT | 3.5 | 0.62 | +0.62 | +1.34 | |
| 10DI | C2,C3,D1 | 3.5 | | +0.62 | +1.34 | ← SYNCHROSHIFT |
| 10BL | C2,D1,CVT | 3.5 | 1.63 | +0.62 | +1.34 | |
| 90BL | C2,D1,CVT | 1.00 | 1.00 | +0.38 | +2.19 | |
| 90DL | C1,C2,D1 | | 1.00 | +0.38 | +2.19 | ← SYNCHROSHIFT |
| 90AL | C1,D1,CVT | 1.00 | 1.00 | +0.38 | +2.19 | |
| 10AL | C1,D1,CVT | 3.5 | 0.62 | +0.23 | +3.59 | |
| | | | | | | ← NEUTRAL |
| R | B1,C2,D1 | | 0.30 | −0.113 | −7.34 | |
| | | | | | | |

CONTINUOUSLY VARIABLE

FIG. 2A
$3.59 > \dot{\varepsilon}/\dot{\varphi} > 2.19$
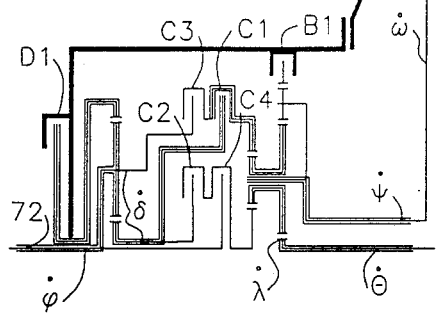
FIG. 2B
$2.19 > \dot{\varepsilon}/\dot{\varphi} > 1.34$
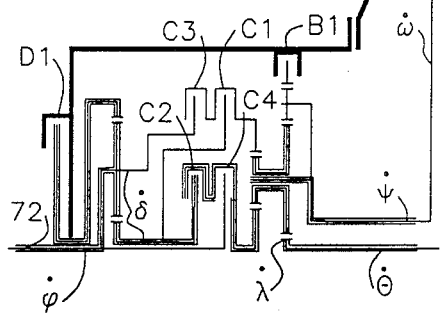
FIG. 2C
$1.34 > \dot{\varepsilon}/\dot{\varphi} > 0.80$
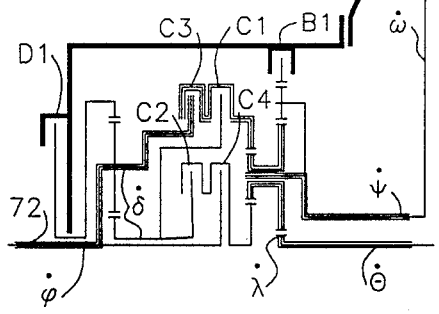
FIG. 2D
$0.80 > \dot{\varepsilon}/\dot{\varphi} > 0.51$
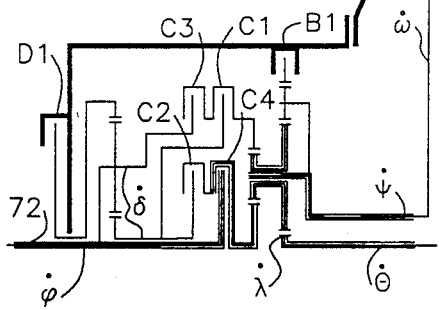
FIG. 2E    $\dot{\varepsilon}/\dot{\varphi} = -3.44$
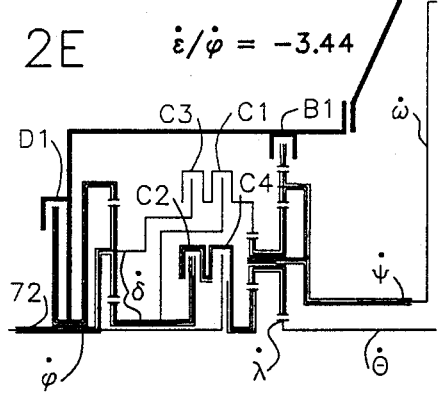

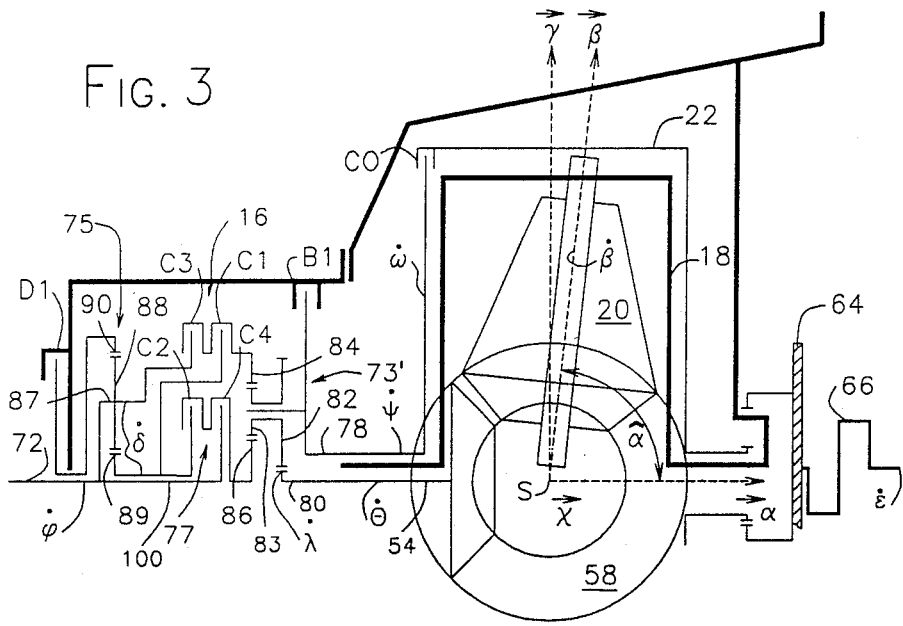

| | |
|---|---|
| $p_1$ | = −0.154 |
| $p_2$ | = +0.251 |
| $\kappa_{in}$ | = +1.200 |
| $\kappa_3$ | = +0.370 |
| $\kappa_4$ | = +1.000 |

FIG. 3T ($+1.00 < K\rho < +3.5$)

| POINT | MEMBERS APPLIED | $K\rho$ | $\dot{\delta}/\dot{\omega}$ | $\dot{\varphi}/\dot{\omega}$ | $\dot{\varepsilon}/\dot{\varphi}$ | |
|---|---|---|---|---|---|---|
| 10BH | C4,CVT | 3.5 | 1.63 | +1.63 | +0.51 | |
| 90BH | C4,CVT | 1.00 | 1.00 | +1.00 | +0.80 | |
| 90DH | C3,C4 | | 1.00 | +1.00 | +0.80 | ← SYNCHROSHIFT |
| 90AH | C3,CVT | 1.00 | 1.00 | +1.00 | +0.80 | |
| 10AH | C3,CVT | 3.5 | 0.62 | +0.62 | +1.34 | |
| 10DI | C2,C3,D1 | 3.5 | | +0.62 | +1.34 | ← SYNCHROSHIFT |
| 10BL | C2,D1,CVT | 3.5 | 1.63 | +0.62 | +1.34 | |
| 90BL | C2,D1,CVT | 1.00 | 1.00 | +0.38 | +2.19 | |
| 90DL | C1,C2,D1 | | 1.00 | +0.38 | +2.19 | ← SYNCHROSHIFT |
| 90AL | C1,D1,CVT | 1.00 | 1.00 | +0.38 | +2.19 | |
| 10AL | C1,D1,CVT | 3.5 | 0.62 | +0.23 | +3.59 | |
| | | | | | | ← NEUTRAL |
| 10DR | B1,D1,CVT | 1.00 | 0.192 | −0.071 | −11.73 | |
| 90DR | B1,D1,CVT | 3.50 | 0.672 | −0.248 | −3.36 | |

CONTINUOUSLY VARIABLE

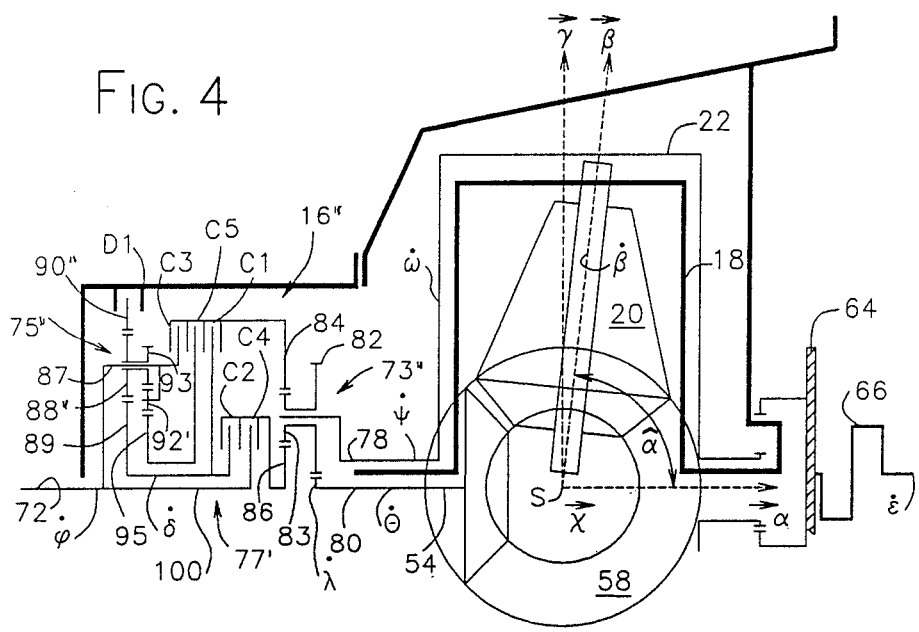

| $p_1$ | $= -0.154$ |
|---|---|
| $p_2$ | $= +0.251$ |
| $\kappa_{in}$ | $= +1.200$ |
| $\kappa_3$ | $= +0.378$ |
| $\kappa_4$ | $= +1.000$ |

FIG. 4T ($+1.00 < K\rho < +3.5$)

| POINT | MEMBERS APPLIED | $K\rho$ | $\dot\delta/\dot\omega$ | $\dot\varphi/\dot\omega$ | $\dot\varepsilon/\dot\varphi$ | |
|---|---|---|---|---|---|---|
| 10BH | C4,CVT | 3.5 | 1.63 | +1.63 | +0.51 | |
| 90BH | C4,CVT | 1.00 | 1.00 | +1.00 | +0.80 | |
| 90DH | C3,C4 | | 1.00 | +1.00 | +0.80 | ← SYNCHROSHIFT |
| 90AH | C3,CVT | 1.00 | 1.00 | +1.00 | +0.80 | |
| 10AH | C3,CVT | 3.5 | 0.62 | +0.62 | +1.34 | |
| 10DI | C2,C3,D1 | 3.5 | | +0.62 | +1.34 | ← SYNCHROSHIFT |
| 10BL | C2,D1,CVT | 3.5 | 1.63 | +0.62 | +1.34 | |
| 90BL | C2,D1,CVT | 1.00 | 1.00 | +0.38 | +2.19 | |
| 90DL | C1,C2,D1 | | 1.00 | +0.38 | +2.19 | ← SYNCHROSHIFT |
| 90AL | C1,D1,CVT | 1.00 | 1.00 | +0.38 | +2.19 | |
| 10AL | C1,D1,CVT | 3.5 | 0.62 | +0.23 | +3.59 | |
| | | | | | | ← NEUTRAL |
| 10R | C5,D1,CVT | 3.5 | 0.62 | −0.15 | −5.55 | |
| 90R | C5,D1,CVT | 1.00 | 1.00 | −0.25 | −3.36 | |

CONTINUOUSLY VARIABLE

| $P_1$ | = -0.192 |
| $P_2$ | = +0.365 |
| $\kappa_{in}$ | = +0.800 |
| $\kappa_3$ | = +0.272 |
| $\kappa_4$ | = +1.000 |

(+1.00 < $K_x\rho$ < +3.5)

| POINT | MEMBERS APPLIED | $K_x\rho$ | $\dot{\delta}/\dot{\omega}$ | $\dot{\varphi}/\dot{\omega}$ | $\dot{\varepsilon}/\dot{\varphi}$ | |
|---|---|---|---|---|---|---|
| 10BH | C2,CVT | 3.50 | 1.91 | 1.91 | +0.65 | |
| 90BH | C2,CVT | 1.00 | 1.00 | +1.00 | +1.25 | |
| 90DH | C1,C2 |  | 1.00 | +1.00 | +1.25 | ← SYNCHROSHIFT |
| 90AH | C1,CVT | 1.00 | 1.00 | +1.00 | +1.25 | |
| 10AH | C1,CVT | 3.50 | 0.52 | +0.52 | +2.40 | |
| 10DL | D1,C1 |  | 0.52 | +0.52 | +2.40 | ← SYNCHROSHIFT |
| 10BL | D1,CVT | 3.50 | 0.52 | +0.52 | +2.40 | |
| 90BL | D1,CVT | 1.00 | 1.00 | +0.27 | 4.60 | |
|  |  |  |  |  |  | ← NEUTRAL |
| R | B1,C2,D1 |  | 0.30 | -0.11 | -7.34 | |
|  |  |  |  |  |  | |
|  |  |  |  |  |  | |
|  |  |  |  |  |  | |

CONTINUOUSLY VARIABLE

TRACTION DRIVE TRANSMISSION SYSTEM

CROSS-REFERENCE TO RELATED APPLICATION

This is a continuation-in-part of U.S. application Ser. No. 435,658, filed Nov. 13, 1989 now abandoned, which is a continuation-in-part of U.S. application Ser. No. 270,639, filed Nov. 14, 1988 now abandoned.

BACKGROUND OF THE INVENTION

This invention relates to continuously variable, power transmission systems and, more particularly, it concerns an improved multi-range split power transmission system of the type in which a continuously variable transmission unit (CVT) is bicoupled with a four shaft compound planetary device in a manner to increase the system efficiency in a compact system configuration.

Two range split power transmission systems, which incorporate a CVT bicoupled to a compound four-shaft planetary splitter in order to increase the efficiency of the transmission system to a higher level than that of the CVT by itself, are well known in the art. Two of the shafts of the splitter are selectably connected to the output shaft of the system to effect a "Mode A" operation in which the output speed of the CVT is subtracted from the system input speed and a "Mode B" operation in which CVT output speed is added to system input speed. In these transmission systems the CVT speed ratio is adjusted between two extreme values, the shifting from one range to the other occurring at generally synchronous speeds. The two selectable planetary shafts can be connected alternatively to the system input shaft (U.S. Pat. No. 4,363,247, 3,714,845 and UK Pat. No. 2,115,091), or to the system output shaft (U.S. Pat. Nos. 4,434,681, 4,382,392), or to the output shaft of the CVT (U.S. Pat. Nos. 3,969,958, 3,626,787, 3,675,507), directly or through a fixed ratio gear reduction.

In U.S. Pat. No. 4,856,371 issued to the present inventor on Aug. 15, 1989, a traction drive CVT is combined with a planetary gear power splitter in a system by which Mode A and Mode B operation of the system are effected in a manner to optimize CVT efficiency in a very compact system geometry. The compactness of the system is obtained in substantial measure by mounting the carrier of a double planet gear set in a tubular system input shaft which provides also the input of the CVT. The CVT output shaft extends within the tubular system input shaft to sun gears in mesh with the planets of the double planet set and is alternately engaged with the sun gears to attain the broad range of system input/output speed ratios.

It is known that the lower the speed range for each power splitting range, the higher the transmission system efficiency will be for a given CVT speed ratio range. It is therefore common to add a two range gear box to a two range split power transmission system in order to decrease the range of each operating Mode while keeping the same overall system speed ratio range. The problem with these arrangements is that the shifting between the middle ranges of the system, although performed at synchronous speeds, requires the operation of as many as four clutches simultaneously. This clutch operation, in turn, requires a complex control system and clutches capable of slipping under full torque causing dissipation of large amounts of heat. Therefore, four range split power transmission systems which require only synchronous shifting of two clutches between each range have been proposed. In these transmission systems, the two selectable shafts of the compound planetary splitter can be connected, each through a separate two-speed gear box to either the input shaft of the transmission system (U.S. Pat. No. 4,682,511), or the output shaft of the transmission system (Prof. F. Jarchow, VDI, University of Bochum), or the output shaft of the CVT. But these transmission systems have multiple parallel shafts as well as a total of four different pairs of gear sets which are coupled alternatively to two shafts of the compound planetary device, thus making such systems complex.

It is apparent, therefore, that there is a need for improvement in multi-range continuously variable power split transmission system of the type in which a CVT is bicoupled with a four shaft planetary splitter.

SUMMARY OF THE INVENTION

In accordance with the present invention, an improved multi-range split power transmission system of the type in which a continuously variable transmission unit (CVT) bicoupled with a four shaft compound planetary splitter is combined with a single two-speed planetary output gear in a manner to provide a simplified and compact organization of transmission components.

The CVT used in the system is preferably, but not necessarily, one having the desirable geometric configuration and proportions of the general transmission embodiments disclosed in U.S. Pat. No. 4,856,371. The geometry of that CVT is used to combine system input and CVT input in a common shaft and to provide a connection of system input and CVT output respectively, to the first and second shafts of a four shaft planetary gear power splitter. The system incorporates a single two speed gear box in the form of a planetary gear set having a carrier shaft eccentric with respect to and connected directly to system output, an input sun gear and a grounded ring gear. By alternately coupling the third and fourth shafts of the splitter with the gear box carrier shaft and the gear box sun gear, at least three synchronous ranges of system speed are provided. The ring gear of the gear box may be releasably grounded through friction coupling such as a clutch or a brake. The gear box ring gear coupling thus provided may be used for system start-up and to absorb energy required to accelerate an engine input, as during down-shifting operation of the system, without alternate engagement and disengagement of the clutches coupling the splitter to the gear box.

A principal object of the present invention is, therefore, the provision of a highly compact and efficient continuously variable transmission system having a broad output speed range. Another object of the invention is to provide such a transmission system in which the shift between four ranges require only the synchronous shifting of two clutches simultaneously. A still further object of the invention is the provision of such a transmission system which enables down-shifting for engine braking operation without requiring adjustment of the CVT throughout adjacent system ranges. A still further object of the invention is to provide reversing of the output shaft of the system. Other objects and further scope of the invention as well as additional features thereof will become apparent from the detailed description to follow taken in conjunction with the accompanying drawings in which like parts are designated by like reference numerals.

BRIEF DESCRIPTION OF THE DRAWINGS

FIG. 2 a schematic view demonstrating one embodiment of the transmission system of the present invention;

FIG. 2P is a table of parameters embodied in the transmission 2;

FIG. 2T is a table showing the various operating parameters during different phases of system operation;

FIGS. 2A–2E are schematic views depicting the flow of power through the gearing of the embodiment in FIG. 2 under conditions of operation;

FIG. 3 is a schematic view illustrating an alternative of the invention;

FIGS. 3P and 3T are tables similar to the tables of FIGS. 2P and 2T but representative of the values during operation of the embodiment of FIG. 3;

FIG. 4 is a schematic view illustrating a further alternative embodiment of the invention;

FIGS. 4P and 4T are tables applicable to the embodiment of FIG. 4; and

DETAILED DESCRIPTION OF THE PREFERRED EMBODIMENTS

Figure 1:
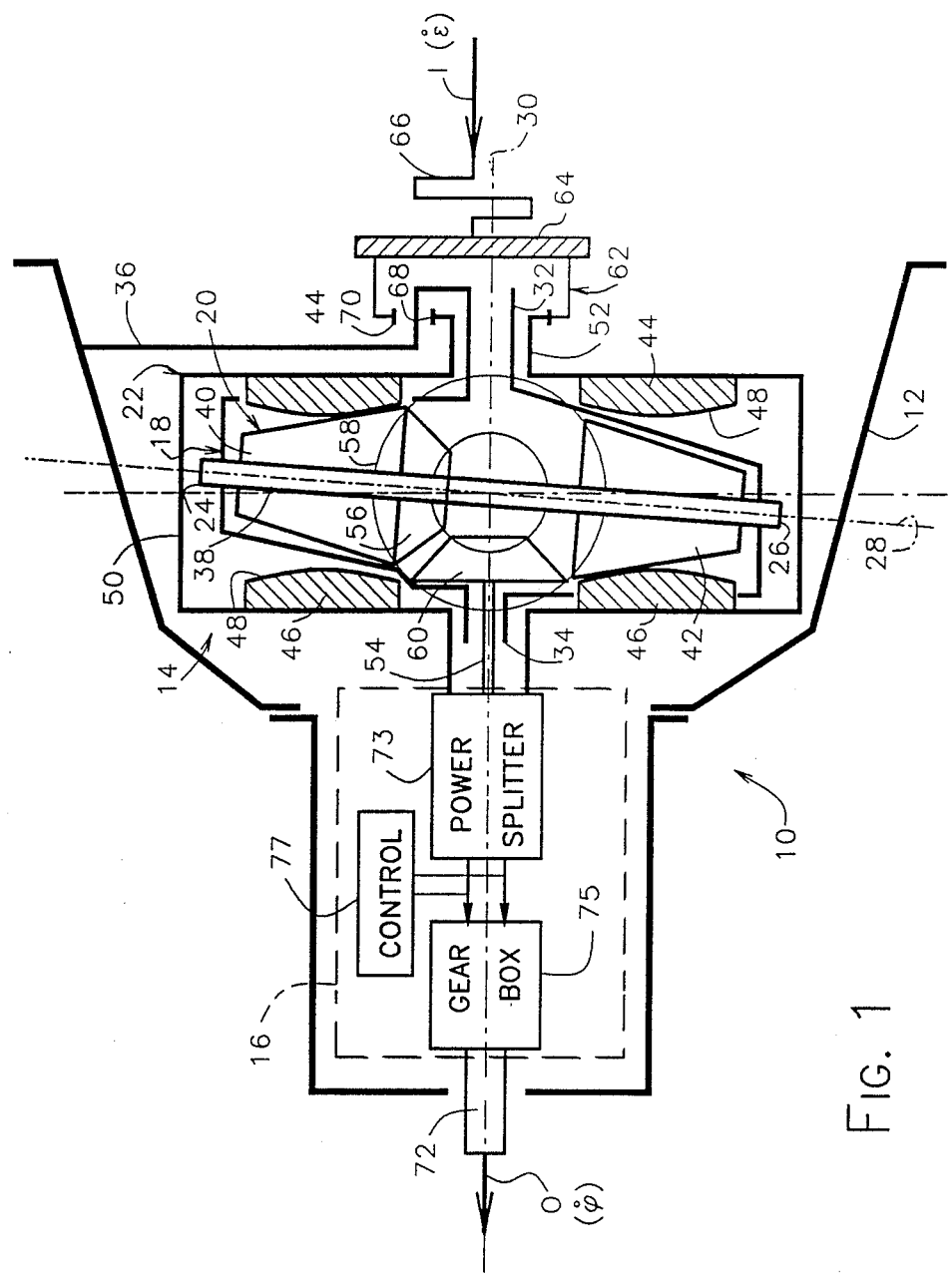
FIG. 1 is a longitudinal cross section illustrating a general embodiment of the present invention.

FIG. 1 of the drawings shows the major components of a transmission system in accordance with the present invention and generally designated by the reference numeral 10. It is to be noted that while all the working components of the system 10 are not illustrated in this drawing figure, the external frame or housing designated by the reference numeral 12 from which the illustrated components are supported and both the upper and lower portions of the transmission system are fully illustrated in FIG. 1. The system contained within the frame or housing 12 thus includes a CVT 14 and an output gearing and control module in block diagram form and represented generally by the dashed line rectangle 16. The module 16 will be described in more detail below.

Although the CVT 14 is substantially identical to the CVT embodiment disclosed in U.S. Pat. No. 4,856,371 issued to the present inventor, a description of the CVT with reference to FIG. 1 is believed helpful to a full understanding of the present invention. Thus, the CVT 14 includes as major working components, an alpha body 18, a beta body 20 and an omega body assembly 22. The alpha body 18, which may be generally circular in outline, rotatably supports opposite ends 24 and 26 of the beta body 20 about an axis 28 which is inclined with respect to and intersects a primary transmission axis 30 at a point S of axes intersection. The alpha body extends inwardly to a pair of hubs 32 and 34, the outboard hub 32 being secured against rotation with respect to the housing 12 by a member 36.

The beta body 20 includes a central shaft 38 supporting a pair of oppositely converging cone members 40 and 42. The cone members 40 and 42 are slidable axially of the beta body but secured for rotation therewith.

The omega body assembly 22 includes a pair of plate members 44 and 46, each having a generally radial rolling surface of revolution 48 about the primary transmission axis 30 and supported for rotation about the hubs 32 and 34 of the alpha body 18. The plates 44 and 46 are connected as a unit by an external torque cage 50, which, as shown, is integral with a tubular input or omega shaft 52.

The beta body shaft 38 is linked to a CVT output or theta shaft 54 by a bevel gear 56, carried by or otherwise fixed to the shaft 38, which meshes with a beveled idler gear 58 carried by the alpha body 18 to be rotatable on an axis perpendicular to a plane including the axes 28 and 30. The idler gear 58 meshes in turn with a bevel gear 60 on the theta shaft 54. The inclusion of the idler gear 58 allows meshing of the gears 56,58,60 as simple bevel gears without any adverse effect as a result of varying the angle α between the axes 28 and 30. While the significance of the gearing 56,58,60 will be described in more detail below, it will be noted from the components thus far described that rotation of the omega body cage 50 will carry the omega plates 44 and 46 in rotation relative to the beta body 20 which, while rotatable on its axis 28, is fixed against rotational translation about the primary transmission axis 30 by virtue of the alpha body 18 being fixed at 36 to the housing 12. The beta body cones 40 and 42 are retained in rolling friction engagement at two points of contact with the surface 48 of the respective omega plates 44 and 46. Thus, rotation of the omega plates 44 and 46 will cause rotation of the beta body 20 and its shaft 38 to drive the gear 56, the idler gear 58, the gear 60 and the theta shaft 54. The ratio at which the shaft 54 will be driven in relation to the input shaft 52 will be a function of the gearing 56,58,60 but more significantly the function of the relative radius of the cone members and 42 and the omega plates 44 and 46.

The tubular input or omega shaft 52 extends to an input gearing unit 62 to couple the omega body to a source of power input, such as a flywheel 64 and crank shaft 66 of an internal combustion engine (not shown). In the general embodiment of FIG. 1, the shaft 52 includes a terminal gear 68 which meshes with a ring gear 70 fixed to the flywheel 64. The lower portion of the tubular hub 32 of the alpha body 18 is windowed to permit the gears 68 and 70 to mesh.

While the operation of specific embodiments of the system 10 will be described in detail below, a summary of terms used herein and in the appended claims is in order. For example, the term, "transmission system" is intended as designating the organization of power transmitting components and controls which operate to transmit power from the input ring gear 70 to an output shaft 72 (FIG. 1). A transmission system, as thus defined, is typically used with reduction transfer gearing which, though not necessarily a part of the transmission system, affect the relative meaning of other terms.

The term "CVT" is intended to mean those parts of the CVT 14 between the input shaft 52 and the theta shaft 54 and is believed well defined in the previous description. On the other hand, the terms "CVT input" and "system input" are less clearly delineated because the physical components functioning to input power to the CVT and to input power to the system may be embodied as one member (e.g., the shaft 52). Nevertheless, the terms are meaningful from the standpoint of understanding the respective speed ratios of the CVT as distinguished from the speed ratios of the transmission system including that CVT. Also it is intended that the term "continuously variable transmission unit" or "CVT" encompasses other forms of such units, such as adjustable belt drives, hydrostatic pump-motor drives and the like, which develop continuously variable speed ratios.

The "basic ratio" of planetary gearing as used herein and in the appended claims is the ratio of rotation speed at an output component to the rotation speed of the input component when the planet carrier is grounded or held against rotation. Also, with respect to gearing, the terms "negative" and "positive" when applied to a ratio value is intended to denote the direction of a driving gear relative to a driven gear. Specifically, the ratio of a single driving spur gear and a single driven spur gear is negative because these gears rotate in opposite directions. The ratio of a driving spur gear to an internal ring gear is positive because both driving and driven gears rotate in the same direction.

With reference again to FIG. 1 of the drawings, the gearing and control module 16 included in the transmission 10 between the CVT 14 and the system output shaft 72 is depicted in block diagram form as including a power splitter 73, a multi-ratio gear box 75 and a control 77 by which the power splitter may be connected selectively with the gear box. The term "control" as used in the legend of FIG. 1 is intended in a very general sense to include clutches, brakes and other such coupling devices used to couple various gear components to be described in which determine the speed ratio of the system 10.

Specific components of the module 16 may be seen and understood by reference to FIG. 2 in which an embodiment of the invention is illustrated with gearing and control components detailed in line form. Thus, in FIG. 2, the power splitter 73 is a four-shaft planetary gear set having a first or carrier driving shaft 78, a second or sun driving shaft 80, a pair of coupled planet gears 82 and 83, a third shaft driven by a ring gear output 84 and a fourth shaft driven by a sun gear output 86. System input power, as transmitted by the omega body 22, is connected at all times in this embodiment with the first or carrier driving shaft 78 of the splitter 73 whereas the CVT output at the theta shaft 54 is similarly connected to the second or sun driving shaft 80 of the splitter 73.

The gear box 75, in the embodiment of FIG. 2, is a planetary gear set including a carrier 87, eccentric with respect to and connected to the system output shaft 72, a planet gear 88 on the carrier, a sun gear 89 and a ring gear 90.

In the following description, it is assumed that all rotating speeds are relative to the speed of the first shaft or input to the system. Therefore, if the rotating speed of a shaft is equal to 1, it means that its rotating speed is the same as the rotating speed of the first shaft. In the preferred embodiment of this disclosure, the first shaft is the omega shaft 52. Also "speed" means "rotating speed".

The power splitter 73 is a four-shaft compound planetary gear set which has the following characteristics: (a) the first and second shaft are connected respectively to the system input and to the output of the CVT; (b) the third and fourth shafts are alternatively connected to the gear box 75; and (c) the gear reduction K between the CVT output at the beta body shaft 38 and the second shaft is selected such that the second shaft speed equals to 1 at one of the CVT extreme ratio positions. The other extreme ratio position is then defined as the "shifting ratio" and the corresponding speed of the second shaft is "shifting speed".

The third shaft has a speed which is always equal or lower than the system input speed ("Mode A"), and the fourth shaft has a speed which always equal or greater than the system input speed ("Mode B"). In Mode A the fraction of the system input power which is handled by the CVT is supplied by the splitter to the CVT (feedback power), and in Mode B, the fraction of the power handled by the CVT is supplied to the splitter by the CVT (power is split).

It is known in the art that a four-shaft compound planetary device is in fact two simple planetary sets which are connected together and share some of their components ("Epicyclic Drive Trains" by Muller). In the embodiment of FIG. 2, for example, the two planetary gears 82 and 83 share a common carrier and a common planet shaft. As a result, the four-shaft planetary splitter is analyzed as two separate planetary sets having two different basic ratios $p_1$ and $p_2$, the first planetary set being connected to the first, second and third (i.e., the ring gear 84) shafts, and, the second one to the first, second and fourth (i.e., the sun gear 86) shafts. The relation between the speeds of the three shafts of these planetary sets have different expressions depending on the function of the carrier, which can be either the driving (first shaft), controlled, (second shaft) or driven (third or fourth shaft).

| | |
|---|---|
| (1) [carrier driving] | $\delta/\omega = p_{1,2}(K\rho - 1) + 1$ |
| (2) [carrier controlled] | $\delta/\omega = p_{1,2}(1 - K\rho) + K\rho$ |
| (3) [carrier driven] | $\delta/\omega = (1 - K\rho p_{1,2})/(1 - p_{1,2})$ |

In these equations, the value $P_{1,2}$ represents either the basic ratio $p_1$ of the planetary set having the third shaft 84 as output or the basic ratio $p_2$ of the planetary set having the fourth shaft 86 as output. The function $(\rho)$ is the radius ratio of the CVT 14 at the contact points between the beta body cones 40 and 42 and their respective omega plates 44 and 46. The ratio (K) is the total reduction ratio between the beta shaft 38 and the second shaft of the splitter 80.

In the embodiment of FIG. 2, the value of (K) is such that $(K\rho)$ is equal to 1 when the speed of the beta shaft 38 is at its minimum, or in other words, when $(\rho)$ is at its minimum. In the embodiment of FIG. 2 $(K\rho)$ will vary between 1 and 3.5, this last value being reached when the second shaft is at its shifting speed. The planetary basic ratios $p_{1,2}$ can be calculated according to the equations 1 to 3 to get the desired speed range for the third and fourth shafts. In FIG. 2, the splitter is a compound planetary which is composed of two simple planetary sets, the carriers of which are both driven, so Equation (1) applies for both.

It should be noted here that in the embodiment of FIG. 2 the value of (K) likewise could have been set such that $(K\rho)$ is equal to 1 when the speed of the beta shaft 38 is at its maximum, or in other words when $(\rho)$ is at its maximum. This could be accomplished by changing the reduction ratio of the bevel gear set 56, 58, 60. In this case $(K\rho)$ would vary between $1/3.5 = 0.2857$ when the second shaft is at its shifting speed, and 1. The planetary basic ratios $p_{1,2}$ would be calculated then according to Equations (1-3) to get the same speed range for the third and fourth shafts as before.

It will be appreciated that in Equations (1-3), whenever the function $(K\rho)$ is equal to 1, and regardless of the value of the basic ratio of the planetary $p_{1,2}$, the speed of all the components of the planetary are the same and equal to 1. That particular situation allows the release of the third shaft coupling while engaging the fourth shaft coupling without slippage, because these two shafts have the same speed ratio.

The efficiency of a system in which a planetary device is bicoupled to a CVT is increased because the power is split between a direct mechanical path and the CVT itself. Therefore, the losses of the CVT affect only a fraction of the total system input power.

The power recirculation factor $Pc_1$ is the ratio between the power flowing through the CVT and the input power into the transmission system. The factor $Pc_1$ when the second shaft is at the shifting speed, is only a function of the speed range $R_{a,b}$ of the third or fourth shafts and of the speed range r of the CVT, and is given by the following expression:

$$Pc_1 = (1 - 1/R_{a,b})/(1/r - 1) \quad (4)$$

When the speed of the third shaft is equal to the speed of the first shaft, the ratio $Pc_2$ is given by the following expression:

$$Pc_2 = -p_{1,2} \quad (5)$$

Equations (4) and (5) give the power recirculation factors at the two extreme ratios of the CVT. It is important to note that the power recirculating factors $Pc_{1,2}$ are completely independent of the particular construction of the planetary sets. In other words, assuming a given CVT and a given desired speed range for each of Mode A and Mode B operation, whatever the construction of the planetary splitters, the efficiency of the system will be identical, so long as the basic ratios of the planetary sets are correct. It is clear from these equations that the lower the speed range of the third and fourth shafts or the speed ratio of the operating Modes, the lower the power recirculation factor $Pc_1$, and, therefore, the lower the amount of power which is handled by the CVT, and the higher the system efficiency.

In the embodiment of FIG. 2, the gear box includes, in addition to the carrier 87, the planet gear 88, the sun gear 89 and the ring gear 90, a shaft 100, which extends through the sun gear 89 on the opposite side of said shaft 72. The reduction ratio $K_3$ between the sun 89 and the carrier 87 with the ring 90 grounded is such that, when the second shaft 80 of the splitter 73 is at its shifting speed, the speed of the third shaft 84 is equal to the speed of the fourth shaft 86 times the reduction ratio $K_3$, or in other words:

$$K_3 = [p_1(K\rho' - 1) + 1]/[p_2(K\rho' - 1) + 1] \quad (6)$$

where $\rho'$ is the shifting ratio of the CVT.

In FIG. 2, the transmission of power between the splitter 73 and the gear box 75 is determined by the control 77 which includes releasable torque coupling devices or clutches designated by the reference characters B1, C1, C2, C3, C4 and D1. The table of FIG. 2T and the power path illustrations of FIGS. 2A–2E illustrate the function of each clutch. Moreover, it will be noted that the clutches C1 and C3 and clutches C2 and C4 are respectively paired on the same member. Because the individual clutches of each such pair are not in the same condition of actuation at any time during operation of the transmission system, the clutches in each pair may share a push-pull class of actuator. In other words, a single hydraulically actuated member (not shown) may be used to actuate both clutches of each pair C1,C3 and C2,C4 by actuation in opposite directions.

The output shaft 72, to which the carrier 87 of the gear box 75 is connected, is extended by the shaft 100 directly to the clutch C4. The carrier 87 extends, without intermediate gearing or other components, directly to the clutch C3. As a result of this construction, when the CVT ratio is equal to 1, then both clutches C3 and C4 may be engaged simultaneously without substantial slippage. The clutches C1 and C2 are similarly related to the sun gear 89 of the gear box 75. Specifically, the outputs of both clutches C1 and C2 are both connected to the same shaft, that is, the shaft to which the sun gear 89 of the gear box 75 is keyed or otherwise connected. Hence, when the ratio of the CVT is equal to 1, both clutches may be engaged without substantial slippage because both become connected to a common rotatable output. The speed ratio of the sun gear 89 and of the carrier 87 while the ring gear 90 is grounded, is such that when the second shaft is at its shifting speed, the speed of the shafts 86,89 and 84,87 are respectively the same, and therefore the both clutches C2 and C3 may be engaged simultaneously without substantial slippage. While adjusting the CVT between its extreme ratio positions, shifting under power from one range to the next may therefore be set to occur only through essentially synchronized shifts, which minimize the power losses in the clutches C1, C2, C3, C4.

Two other coupling devices are used in the embodiment of FIG. 2, namely the coupling devices B1 and D1. While the clutch B1 is of the same type as the clutches C1–C4, the coupling device D1 which operates primarily as a grounding device for the ring gear 90 of the gear box 75, is used also as a starting devise and therefore built to be able to dissipating heat. The coupling device D1 can be either internal or external to the housing 12, and in the embodiment of FIG. 2, is shown as a dry air cooled clutch positioned outside of the housing.

In FIG. 2, four forward ranges of operation are shown and identified in the first column of FIG. 2 as AL, BL, AH and BH. These designations indicate a first range in which a Low range of Mode A operation is followed by a Low range of Mode B operation, followed by a High range of Mode A operation, followed by a High range of Mode B operation. When the transmission is in Low range either the third or the fourth shaft are connected to the output shaft of the system with a reduction whereas when in High ratio the same two shafts are connected to the output shaft without reduction. Shifting between the afore-mentioned four forward ranges is completely synchronous in the sense that transfer by one clutch and engagement of another can occur by full engagement of both without substantial slippage before releasing the one clutch. As may be seen from the table of FIG. 2T, a shift from the first forward range AL to the second forward range BL occurs by engaging the clutch C2 while the clutch C1 and brake D1, applied in the first range, remain applied and then releasing the clutch C1 while applying the clutch C1 and the brake D1 for the second range. In shifting from the second forward range BL to the third forward range AH, a similar complete synchronous shifting transfer is effected because of the relationship of the basic ratio of the gear box 75, the ratios P1, P2, of the splitter 73 and the value of the function $K\rho$ at which the transfer occurs. Because of the relative ratios, when the point 10BL of the second range BL is reached, the rotating of the carrier 87 in the gear box 75 is the same and in the same direction as the speed of the ring gear driven third shaft 84 of the splitter 73. Thus, while the brake D1 and the clutch C2 are engaged, the clutch C3 may be engaged, again without substantial slippage or interruption of power transfer. This engagement is followed by a release of the brake D1 and of the clutch C2 to attain the third forward range AH. Finally, the transfer between the third range AH and the fourth range BH again involves transfer from engagement of the clutch C3 to the clutch C4. As above-mentioned, both of these clutches engage with the common output shaft 72 to effect the transfer into the fourth forward range followed by release of the clutch C3.

In the situation where an automotive vehicle equipped with the system of FIG. 2 is coasting, typically the transmission is in maximum overdrive position, or 10BH. To reaccelerate the car, it is necessary to downshift the transmission to the lowest ratio. In this transmission it is possible to downshift very rapidly from 10BH to 10AL or 10BL without shifting the CVT 14 through 10BH>90BH>90AH>10AH>10BL>90BL>90AL>10AL. This is accomplished by releasing the clutch C4, engaging the clutch C1 to select the ratio 10AL, and then applying progressively the clutch D1. The heat generated while bringing the engine to its new speed is dissipated by the clutch D1. Likewise, when the car is in the overdrive ratio 10BH while at a cruising speed, it is possible to downshift directly from 10BH to 10BL without adjusting the CVT, by releasing the clutch C4, engaging the clutch C2 and applying progressively the clutch D1 to bring the engine up to speed.

Also, and as may be seen in FIG. 2E, as well as from the table 2T, a reverse mode of operation is effected by engaging both the clutches B1, D1 and C4. In this reverse mode, the clutch D1 is used as the starting clutch and the CVT is not used for reverse. The traction contacts are disconnected by releasing the pressure applying the plates against the cones.

In FIG. 3 of the drawings, an alternative embodiment of the system of the present invention is shown in which like parts are designated by the same reference numerals used in FIG. 2 and corresponding but slightly different parts are designated by the same reference numerals primed. The embodiment of FIG. 3 differs from the embodiment FIG. 2 primarily in the gearing arrangement employed to attain a reverse direction of rotation at the output shaft 72. In particular, a normally engaged clutch CO is included to release the system input (as distinguished from CVT output) from the drive train. When the clutch CO is thus released, and the clutch B1 engaged, the carrier of the splitter 73' is retained against movement. By engaging the friction clutch D1 while the clutch B1 is engaged and the clutch CO released, the splitter 73' now operates as a simple reduction gear train by which power at the CVT output or theta shaft 54 is transmitted to the system output shaft 72 at very low but continuously variable output/input system speed ratios in either "forward" or "reverse" directions of output shaft rotation depending on which of the clutches C1, C3 or C2, C4 are engaged. Thus, when either one of the clutches C1 or C3 is engaged, a "reverse" range of operation will occur at very low speed output with the clutch C1 engaged due to the sun 89 of the gear box 75 driving the shaft 72 through the planet gear 88 and carrier 87. Higher "reverse" output speeds will occur with the clutch C3 engaged to couple the splitter shaft 84 directly with the shaft 72. Similarly, very low "forward" ranges of speed will be attainable by engaging either of the clutches C2 or C4.

In FIG. 4 of the drawings, an alternative embodiment of the system of the present invention is shown in which like parts are designated by the same reference numerals used in FIG. 2 and corresponding but slightly different parts are designated by the same reference numerals double primed. The embodiment of FIG. 4 differs from the embodiment FIG. 2 primarily in the gearing arrangement employed to attain a reverse direction of rotation at the output shaft 72. In FIG. 4, a second planetary 92" having a positive basic ratio has been added in order to get a reverse ratio. This planetary 92" shares the carrier and one of the planets of the first planetary, in a construction known as Ravigneaux. The planet gear 88" is modified to include a gear 93 in mesh with a reversing idler 92" rotatably supported by the carrier 87 to mesh with a sun gear 95 keyed to a shaft extending to a clutch C5. The clutch C5 is connected to the ring gear driven third shaft 84 of the splitter 73" so that when engaged with the friction clutch D1 to ground the ring gear 90" of the output gearing 75" a Mode A type of operation will be effected to drive the output shaft 72 in a reverse direction from the four forward speed ratio ranges. Because the CVT is operative in this Mode A reversing arrangement, a continuously variable range of speed ratios is provided in the reverse direction of upward shaft rotation.

Figures 5, 5P, 5T:
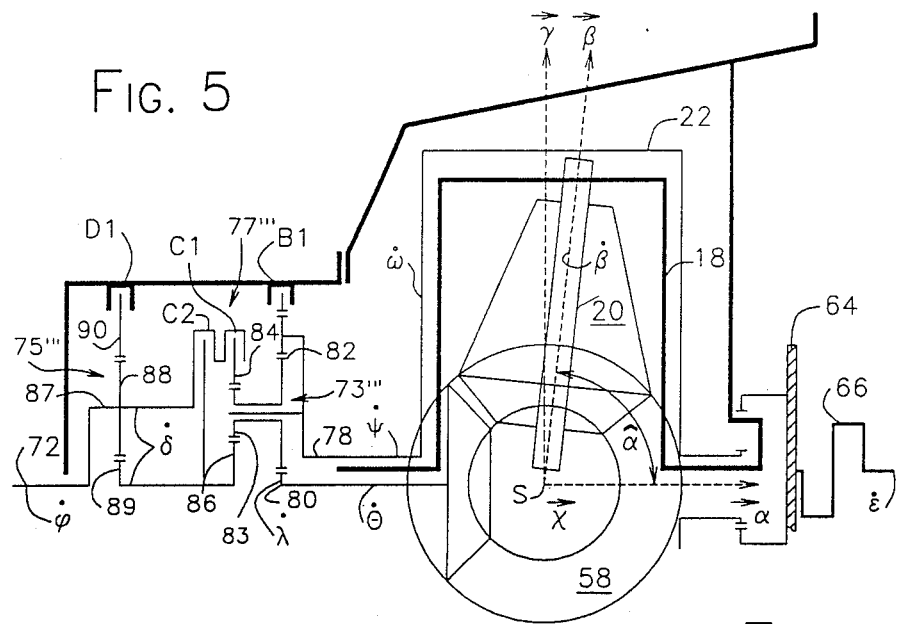
FIGS. 5, 5P and 5T illustrate a still further embodiment of the invention in the format of the previous embodiments.

In FIG. 5 of the drawings, a further alternative embodiment is shown in which like parts are designated by the same reference characters used in FIG. 2 of the drawings and corresponding but slightly different parts are designated by the same reference numerals but triple primed. The embodiment of FIG. 5 is similar to the prior embodiments with the exception that the control system 77''' is simplified substantially by virtue of eliminating one of the four forward speed ratio ranges. As may be seen by reference to FIG. 5T, the lowest of the forward speed ratio ranges involves Mode B operation of the splitter 73''' in which the clutch D1 is engaged, initially with slippage, so that the CVT output and system input are transmitted from the sun gear driven fourth shaft 86 of the splitter 73''' to the sun gear 89 of the gear box 75 to drive the output shaft 72 in a forward direction by orbital movement of the gear box carrier 87. At the upper limit of the first speed ratio range BL, a synchronous shift between the clutches D1 and C1 take place to initiate Mode A operation in which the ring driven third shaft 84 of the splitter 73''' is coupled directly with the carrier 87 of the gear box 75. The third speed ratio range BH is similar to the fourth range of the embodiment of FIG. 2 in the sense that the clutches C1 and C2 effect a synchronous shift transfer between Mode A and Mode B operation.

In light of the foregoing description and accompanying drawing illustrations, it will be appreciated that as a result of the present invention, a highly effective and compact continuously variable transmission system is provided by which the principal objective among others are completely fulfilled. It will also be appreciated that modifications and/or changes may be made in the described embodiments without departure from the invention. Accordingly, it is to be understood that the foregoing description and accompanying drawing illustrations are illustrative of preferred embodiments only, not limiting, and that the true spirit and scope of the present invention will be determined by reference to the appended claims.

I claim:

1. In a multi-range power transmission system including a rotatable system input shaft and a rotatable system output shaft, a continuously variable transmission unit (CVT) having CVT input and CVT output shafts, the output speed of said CVT being adjustable between system input speed and a shifting speed, a four shaft compound planetary gear power splitter having a first shaft driven by said system input shaft, a second shaft driven by said CVT output shaft, a third shaft and a fourth shaft, and a multi-range output gearbox for driving said system output shaft, the improvement comprising:

means for defining said gearbox comprising a planetary gear set having a carrier shaft eccentric with respect to and connected directly to said system output shaft, an input sun gear, a ring gear and means for grounding said ring gear, said planetary gear set having a basic ratio equal to the speed of said third shaft divided by the speed of said fourth shaft when said CVT is at said shifting speed; and control means for alternately coupling said third and fourth shafts of said splitter with said gearbox to provide at least three synchronous ranges of system speed ratios, each of such ranges of system speed ratios being continuously variable by operation of said CVT between 1:1 and said shifting ratio.

2. The power transmission system of claim 1 wherein said means for grounding said ring gear comprises a releasable coupling.

3. The power transmission system of claim 2 wherein said releasable coupling comprises a heat dissipating friction coupling.

4. The power transmission system of either of claims 1, 2 or 3 wherein said control means comprises at least two releasable coupling means for coupling said third and fourth shafts of said splitter alternately with said gear box.

5. The power transmission system of claim 1 wherein said control means comprises first, second, third and fourth coupling means for coupling said third and fourth shafts of said splitter alternately with said gearbox, said first and third coupling means coupling said third shaft of said splitter alternately with said gearbox carrier shaft and said gearbox sun gear, and said second and fourth coupling means coupling said fourth shaft of said splitter alternately with said gearbox sun gear and said system output shaft.

6. The power transmission system of claim 5 wherein said first and second coupling means and said third and fourth coupling means are carried in pairs on separate rotatable members to enable the use of a common actuator for each such pair.

7. The power transmission system of claim 5 wherein said means for grounding said ring gear includes a fifth coupling means for alternately grounding and releasing said gearbox ring gear.

8. The power transmission system of claim 7 wherein said fifth coupling means is capable of transmitting power with slippage.

9. The power transmission system of claim 7 wherein said fifth coupling means is located to facilitate dissipation of heat.

10. The power transmission system of claim 7 including a reversing idler and wherein said control means includes a reversing idler and wherein said control means includes a sixth coupling means for enabling said reversing idler to provide a reverse range of system input/output ratios upon engagement of said fifth and sixth coupling means.

11. The power transmission system of claim 7 wherein the highest input/output ratio of the system is on the order of 5:1 and wherein said fifth coupling means is operable by slippage to increase system output shaft rotation speed to system input speed divided by said highest input/output ratio.

12. The power transmission system of claim 11 wherein said reversing idler and said sixth coupling means operate to reverse the output of said splitter to said gearbox. [, 13. The power transmission system of claim 11 wherein said reversing idler and said sixth coupling means operate to reverse the output of said gearbox with unidirectional operation of said splitter.

14. The power transmission system of claim 1 wherein said CVT is a mechanical traction drive unit.

15. The power transmission system of claim 14 wherein said CVT comprises a beta body having a pair of beta rolling surfaces of revolution about a beta axis, means defining a primary CVT axis, means for supporting said beta body to orient said beta body axis in the plane of said primary CVT axis at an acute angle of intersection with respect to said primary CVT axis and to retain said beta axis against rotational translation about said primary transmission axis but permitting free rotation of said beta body about said beta axis, a pair of plate-like omega body members supported for rotation about and spaced on said primary CVT axis, one such omega body member on each of opposite sides of said beta body, each of said omega body members having omega rolling surfaces of revolution about said primary CVT axis, means for retaining said omega rolling surfaces in rolling friction contact with said beta rolling surfaces at two points of contact, means for adjusting the radius ratio of said beta and omega rolling surfaces equally at said two points of contact continuously between minimum and maximum radius ratio values, a theta shaft rotatable about said primary CVT axis, theta gear means for transmitting torque from said beta body to said theta shaft.

* * * * *